UNITED STATES PATENT OFFICE 2,027,148

PREPARATION OF PROTOCATECHUIC ALDEHYDE

Marion Scott Carpenter, Nutley, and Eric C. Kunz, Montclair, N. J., assignors to Givaudan-Delawanna, Inc., New York, N. Y., a corporation of New York No Drawing. Application May 26, 1934, Serial No. 727,728

6 Claims. (Cl. 260—137)

This invention relates to preparation of protocatechuic aldehyde, and has for its objects to provide a process wherein a maximum yield is obtained with a minimum of tar and by-products, and also by employing an aliphatic chlorinated hydrocarbon solvent to enable recovery thereof without contamination and without substantial loss.

D. R. P. 591,888 discloses the preparation of protocatechuic aldehyde by the reaction of anhydrous aluminum chloride upon heliotropine in the presence of an aromatic hydrocarbon and an aromatic nitrated hydrocarbon.

We have now discovered that the aromatic nitrated hydrocarbon heretofore used as a solvent in the reaction, may be replaced to great advantage by ethylene dichloride, methylene dichloride, chloroform, carbon tetrachloride or similar chlorinated hydrocarbons. This discovery was not to be foreseen, inasmuch as these chlorinated products would be expected to react with the aromatic hydrocarbon to produce hydrocarbons of the di- or tri-phenyl methane type. Such condensations do not take place, however, in the presence of heliotropine, and the solvent is recovered unchanged.

The summation of the reaction can be expressed by the following equations:

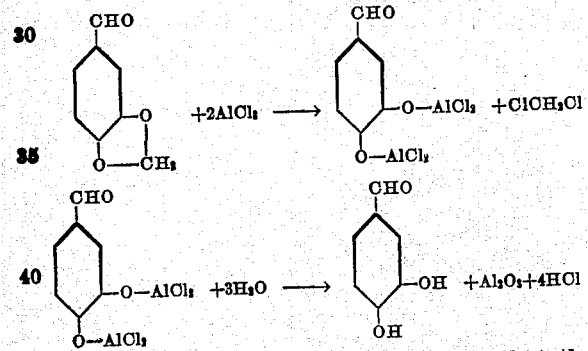

In D. R. P. 591,888 it was assumed that the methylene chloride formed by the splitting of the methylene dioxy bridge then reacted with the aromatic hydrocarbon (for example, toluol) to form ditolyl methane:

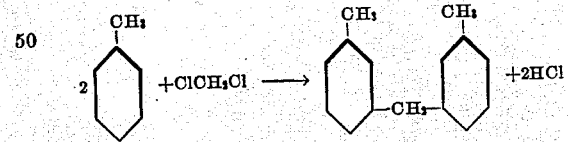

We have made the further discovery that heliotropine may be split with an almost quantitative yield of protocatechuic aldehyde if an amount of aromatic hydrocarbon (such as toluol) only half sufficient to combine with the methylene chloride according to the above equation be used, instead of the large excess cited in the patent referred to.

Thus, while the reaction proceeds in the manner specified above when working according to the specifications of the patent previously cited, our reaction is conducted in a manner essentially different and much simpler, as will be described hereinafter.

Without intending to restrict ourselves to the exact proportions mentioned, the general method of procedure is as follows:

Example 1

To one molecular equivalent of heliotropine dissolved in a solvent such as ethylene dichloride is added two molecular equivalents of anhydrous aluminum chloride. One equivalent dissolves with evolution of heat and the other remains in suspension. When the solution is complete one equivalent of toluol (or similar hydrocarbon) is added and the temperature raised to 40°. Stirring is maintained at 40°–50° until the reaction is complete, as evidenced by the cessation of hydrogen chloride evolution. The reaction mixture is decomposed in the customary manner by pouring onto ice and hydrochloric acid.

At this stage one of the advantages of our process becomes apparent. The protocatechuic aldehyde, being insoluble both in ethylene dichloride and in the aqueous solution of aluminum salts, separates out as a sludge.

The whole is filtered and the aldehyde thus obtained, which constitutes the major portion of the total yield is washed on the filter with fresh ethylene dichloride. After drying it is obtained substantially pure, the only contamination being traces of aluminum hydrate. The small portion of the aldehyde which remains dissolved in the aqueous solution may be extracted with a suitable solvent such as ether.

The ethylene dichloride is recovered without loss and free from toluol by distillation of the non-aqueous filtrate. The toluol-methylene dichloride condensation product remains behind as a tarry residue. The fact that the solvent is recovered uncontaminated constitutes a further advantage over the use of mixed solvents, because in the latter case an indeterminate amount of one is used and the recovered solvent seldom has a constant composition.

The following is a specific example of the practice of our invention, it being understood that the ethylene dichloride may be replaced by carbon tetrachloride, chloroform, methylene dichloride, tetrachlor ethane or similar chlorinated hydrocarbons of the aliphatic series; that the toluol may be replaced with equal effectiveness by benzol, xylol or other aromatic hydrocarbons; and that the proportions cited may be varied within reasonable limits, except that at least two molecular equivalents of aluminum chloride should be used for one molecular equivalent of heliotropine for best yields.

Example 2

150 grams heliotropine is dissolved in 800 grams ethylene dichloride and cooled to about 5° C. 266 grams aluminum chloride is added at such a rate as to keep the temperature at 5–10°, cooling if necessary. 92 grams toluol is then added and the temperature raised rapidly to about 35° at which point a steady evolution of hydrogen chloride commences. Stirring is maintained at a temperature of 35 to 50° until the gas evolution has ceased. The reaction mixture is poured, while still warm, into ice and hydrochloric acid and stirred thoroughly. The resulting pasty mass is filtered directly and the crystals washed with fresh ethylene dichloride. 117 grams is thus obtained. Extraction of the aqueous filtrate yields a further 14 grams. The protocatechuic aldehyde thus obtained—131 grams—represents a yield of 95% of the theory. Without further purification it shows a melting point of 148°.

The invention claimed is:

1. Process for the manufacture of protocatechuic aldehyde comprising reacting heliotropine with anhydrous aluminum chloride in the presence of an aliphatic chlorinated hydrocarbon solvent, followed by treatment with an aromatic hydrocarbon, said heliotropine being present in amount sufficient to prevent reaction between said solvent and said aromatic hydrocarbon.

2. Process for the manufacture of protocatechuic aldehyde comprising dissolving heliotropine in an aliphatic chlorinated hydrocarbon, adding anhydrous aluminum chloride while maintaining a lowered temperature, adding an aromatic hydrocarbon and raising the temperature, and recovering the aldehyde, said heliotropine being present in amount sufficient to prevent reaction between said solvent and said aromatic hydrocarbon.

3. Process for the manufacture of protocatechuic aldehyde comprising dissolving one molecular amount of heliotropine in an aliphatic chlorinated hydrocarbon, adding at least two molecular amounts of anhydrous aluminum chloride while maintaining a lowered temperature, adding an aromatic hydrocarbon while maintaining sufficient heliotropine in the solution to prevent reaction between said solvent and said aromatic hydrocarbon, raising the temperature, and recovering the aldehyde.

4. Process for the manufacture of protocatechuic aldehyde comprising dissolving heliotropine in an aliphatic chlorinated hydrocarbon, adding anhydrous aluminum chloride while maintaining a lowered temperature, adding an aromatic hydrocarbon in an amount equimolecular to the heliotropine, raising the temperature, and recovering the aldehyde.

5. Process for the manufacture of protocatechuic aldehyde comprising dissolving one molecular amount of heliotropine in an aliphatic chlorinated hydrocarbon, adding at least two molecular amounts of anhydrous aluminum chloride while maintaining a lowered temperature, adding an aromatic hydrocarbon in an amount equimolecular to the heliotropine, raising the temperature, and recovering the aldehyde.

6. Process for the manufacture of protocatechuic aldehyde comprising dissolving heliotropine in an aliphatic chlorinated hydrocarbon, adding anhydrous aluminum chloride while maintaining a lowered temperature, adding an aromatic hydrocarbon and raising the temperature while maintaining sufficient heliotropine in the solution to prevent reaction between said solvent and said aromatic hydrocarbon, and separately recovering the aldehyde and the chlorinated hydrocarbon.

MARION SCOTT CARPENTER.
ERIC C. KUNZ.